United States Patent
Furman et al.

(10) Patent No.: US 8,504,335 B2
(45) Date of Patent: Aug. 6, 2013

(54) ROBUST OPTIMIZATION-BASED DECISION SUPPORT TOOL FOR RESERVOIR DEVELOPMENT PLANNING

(75) Inventors: Kevin C. Furman, Houston, TX (US); Vikas Goel, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 302 days.

(21) Appl. No.: 12/864,959

(22) PCT Filed: Mar. 9, 2009

(86) PCT No.: PCT/US2009/036540
§ 371 (c)(1),
(2), (4) Date: Jul. 28, 2010

(87) PCT Pub. No.: WO2009/145960
PCT Pub. Date: Dec. 3, 2009

(65) Prior Publication Data
US 2011/0022363 A1     Jan. 27, 2011

Related U.S. Application Data

(60) Provisional application No. 61/124,500, filed on Apr. 17, 2008.

(51) Int. Cl.
*G06F 17/50* (2006.01)
(52) U.S. Cl.
USPC .................... 703/2; 703/10; 701/106; 706/13
(58) Field of Classification Search
USPC ................. 703/2, 6, 10; 706/13; 701/106
See application file for complete search history.

(56) References Cited

U.S. PATENT DOCUMENTS

| | | | |
|---|---|---|---|
| 5,729,451 | A | 3/1998 | Gibbs et al. |
| 5,764,515 | A | 6/1998 | Guerillot et al. |
| 5,798,982 | A | 8/1998 | He et al. |
| 5,878,372 | A | 3/1999 | Tabarovsky et al. |
| 6,067,340 | A | 5/2000 | Eppstein et al. |
| 6,128,577 | A | 10/2000 | Assa et al. |
| 6,216,083 | B1 * | 4/2001 | Ulyanov et al. ............... 701/106 |

(Continued)

FOREIGN PATENT DOCUMENTS

| | | |
|---|---|---|
| CA | 2 529 339 | 12/2004 |
| EP | 1 865 340 | 12/2007 |

(Continued)

OTHER PUBLICATIONS

Atamtürk, A. (2007), "Strong Formulations of Robust Mixed 0-1 Programming", Mathematical Programming, v108, pp. 235-250.

(Continued)

*Primary Examiner* — Thai Phan
(74) *Attorney, Agent, or Firm* — ExxonMobil Upstream Research Company

(57) ABSTRACT

A robust optimization-based decision support tool for reservoir development planning can comprise a source of input data, an optimization model, a high fidelity model for simulating the reservoir, and one or more solution routines interfacing with the optimization model. The optimization model can consider unknown parameters having uncertainties directly within the optimization model. The model can systematically address uncertain data, for example, comprehensively or even taking all uncertain data into account. Accordingly, the optimization model can provide flexible or robust optimization solutions that remain feasible over an uncertainty space. Once the reservoir model is optimized, final development plans may be generated.

20 Claims, 4 Drawing Sheets

(56) References Cited

U.S. PATENT DOCUMENTS

| | | |
|---|---|---|
| 6,230,101 B1 | 5/2001 | Wallis |
| 6,246,963 B1 | 6/2001 | Cross et al. |
| 6,381,505 B1 | 4/2002 | Kassmann et al. |
| 6,522,973 B1 | 2/2003 | Tonellot et al. |
| 6,609,060 B2* | 8/2003 | Ulyanov et al. ............... 701/106 |
| 6,618,695 B1 | 9/2003 | Hu et al. |
| 6,662,109 B2 | 12/2003 | Roggero et al. |
| 6,674,432 B2 | 1/2004 | Kennon et al. |
| 6,775,578 B2 | 8/2004 | Couet et al. |
| 6,813,565 B1 | 11/2004 | Hu et al. |
| 6,823,297 B2 | 11/2004 | Jenny et al. |
| 6,826,483 B1* | 11/2004 | Anderson et al. ............... 702/13 |
| 6,826,486 B1 | 11/2004 | Malinverno |
| 6,907,392 B2 | 6/2005 | Bennis et al. |
| 6,912,491 B1 | 6/2005 | Van Bemmel |
| 6,941,255 B2 | 9/2005 | Kennon et al. |
| 6,980,940 B1 | 12/2005 | Gurpinar et al. |
| 7,006,951 B2 | 2/2006 | Pond, Jr. et al. |
| 7,027,964 B2 | 4/2006 | Kennon |
| 7,043,413 B2 | 5/2006 | Ward et al. |
| 7,047,165 B2 | 5/2006 | Balaven et al. |
| 7,054,752 B2 | 5/2006 | Zabalza-Mezghani et al. |
| 7,096,122 B2 | 8/2006 | Han |
| 7,096,172 B2 | 8/2006 | Colvin et al. |
| 7,149,671 B2 | 12/2006 | Lim et al. |
| 7,200,533 B2 | 4/2007 | Hu et al. |
| 7,200,540 B2 | 4/2007 | Colvin et al. |
| 7,254,091 B1 | 8/2007 | Gunning et al. |
| 7,260,508 B2 | 8/2007 | Lim et al. |
| 7,277,806 B2 | 10/2007 | Lu et al. |
| 7,310,579 B2 | 12/2007 | Ricard et al. |
| 7,369,973 B2 | 5/2008 | Kennon et al. |
| 7,392,166 B2 | 6/2008 | Le Ravalec-Dupin et al. |
| 7,426,460 B2 | 9/2008 | Noetinger et al. |
| 7,430,501 B2 | 9/2008 | Feraille et al. |
| 7,451,066 B2 | 11/2008 | Edwards et al. |
| 7,478,024 B2 | 1/2009 | Gurpinar et al. |
| 7,496,488 B2 | 2/2009 | Jenny et al. |
| 7,546,228 B2 | 6/2009 | Cullick et al. |
| 7,546,229 B2 | 6/2009 | Jenny et al. |
| 7,558,715 B2 | 7/2009 | Schaaf et al. |
| 7,577,061 B2 | 8/2009 | Williamson et al. |
| 7,584,081 B2 | 9/2009 | Wen et al. |
| 2002/0042702 A1 | 4/2002 | Calvert et al. |
| 2003/0093392 A1* | 5/2003 | Ulyanov ......................... 706/13 |
| 2003/0225606 A1 | 12/2003 | Raghuraman et al. |
| 2004/0220790 A1 | 11/2004 | Cullick et al. |
| 2005/0010383 A1 | 1/2005 | Le Ravalec-Dupin et al. |
| 2005/0015226 A1 | 1/2005 | Le Ravalec-Dupin et al. |
| 2005/0096893 A1 | 5/2005 | Feraille et al. |
| 2005/0120195 A1 | 6/2005 | Kumar |
| 2005/0192855 A1 | 9/2005 | Chitty et al. |
| 2006/0047489 A1 | 3/2006 | Scheidt et al. |
| 2006/0241925 A1 | 10/2006 | Schaaf et al. |
| 2006/0247990 A1 | 11/2006 | Narayanan et al. |
| 2007/0073527 A1 | 3/2007 | Flandrin et al. |
| 2007/0094187 A1 | 4/2007 | Anderson et al. |
| 2007/0094216 A1 | 4/2007 | Mathias et al. |
| 2007/0156377 A1 | 7/2007 | Gurpinar et al. |
| 2007/0179766 A1 | 8/2007 | Cullick et al. |
| 2007/0265815 A1 | 11/2007 | Couet et al. |
| 2007/0294034 A1 | 12/2007 | Bratton et al. |
| 2008/0077371 A1 | 3/2008 | Yeten et al. |
| 2008/0091353 A1 | 4/2008 | Krumhansl et al. |
| 2008/0167849 A1 | 7/2008 | Hales et al. |
| 2008/0288226 A1 | 11/2008 | Gurpinar et al. |
| 2009/0006057 A1 | 1/2009 | Niu et al. |
| 2009/0164187 A1 | 6/2009 | Habashy et al. |
| 2009/0164188 A1 | 6/2009 | Habashy et al. |
| 2009/0234625 A1 | 9/2009 | Zangl et al. |

FOREIGN PATENT DOCUMENTS

| | | |
|---|---|---|
| WO | WO 01/55939 | 8/2001 |
| WO | WO 01/62603 | 8/2001 |
| WO | WO 2006/119099 | 11/2006 |
| WO | WO 2007/058662 | 5/2007 |
| WO | WO 2009/128972 | 10/2009 |
| WO | WO 2009/131761 | 10/2009 |
| WO | WO 2009/145960 | 12/2009 |

OTHER PUBLICATIONS

Bellman, R. (1957), "A Markovian Decision Process," *Journal of Mathematics and Mechanics* 6, pp. 679-684.

Ben-Tal, A. et al. (1999), "Robust Solutions to Uncertain Linear Programs", Operations Research Letters, v25, pp. 1-13.

Ben-Tal, A. et al. (1998), "Robust Convex Optimization", Mathematics of Operations Research, v23, n4, pp. 769-805.

Ben-Tal, A. et al. (2002), "Robust Optimization—Methodology and Applications", Mathematical Programming, v92, pp. 453-480.

Bertsimas, D. et al. (2004), "The Price of Robustness", Oper. Res., v52, n1, pp. 35-53.

U.S. Appl. No. 61/124,500, filed Apr. 17, 2008, Furman et al.

U.S. Appl. No. 61/124,681, filed Apr. 18, 2008, Goel et al.

U.S. Appl. No. 61/124,929, filed Apr. 21, 2008, Goel et al.

Haugen, K.K. (1996), "A stochastic dynamic programming model for scheduling of offshore petroleum fields with resource uncertainty," *European Journal of Operational Research* 88(1), pp. 88-100.

Mezzomo, C.C. et al., "Field Development Planning Optimization Using Reservoir Simulation", Universidade Estadual de Campinas, 8 pgs.

Ordonez, F. (2004), "Lecture 1: Introduction to Robust Optimization", http://ww-ref.usc/edu/fordon/robopt04/, 9 pgs.

Robust Optimization, http:/en.wikipedia.org/wiki/Robust_optimization, 4 pages.

Sweet, M.L. et al. (2007), Genesis field, Gulf of Mexico: Recognizing reservoir compartments on geologic and production time scales in deep-water reservoirs, *AAPG Bulletin* 91(12), pp. 1701-1729.

van Essen, G.M. et al. (2006), "Robust Waterflooding Optimization of Multiple Geological Scenarios", SPE 102913, 2006 SPE Annual Tech. Conf. & Exh., San Antonio, TX, Sep. 24-27, 2006, 7 pgs.

van Essen, G.M. et al. (2006), "Robust Optimization of Oil Reservoir Flooding", Control Applications, 1 pg.

White, D.J. (1993), "A Survey of Applications of Markov Decision Processes," *Jounral of Operational Research Society* 44(11), pp. 1073-1096.

Zandvliet, M. (2004), "Control in reservoir engineering under model uncertainty", Dept. of Geotechnology, Section Petroleum Engineering (Smart Wells group), 2 pgs.

Zhang, Y. (2007), "General Robust-Optimization Formulation for Nonlinear Programming", *J. of Optimization Theory and Applns.* 132(1), pp. 111-124.

European Search Report, dated Dec. 29, 2008, EP Application No. 08159867.4.

International Search Report and Written Opinion, dated Apr. 22, 2009, PCT/US2009/036540.

International Search Report and Written Opinion, dated Mar. 23, 2009, PCT/US2009/032736.

International Search Report and Written Opinion, dated May 4, 2009, PCT/US2009/036536.

\* cited by examiner

ROBUST OPTIMIZATION-BASED DECISION SUPPORT TOOL FOR RESERVOIR DEVELOPMENT PLANNING

CROSS-REFERENCE TO RELATED APPLICATION

This application is the National Stage of International Application No. PCT/US2009/036540, that published as WO 2009/145960, filed 9 Mar. 2009, which claims the benefit of U.S. Provisional Application No. 61/124,500, filed 17 Apr. 2008, each of which is incorporated herein by reference, in its entirety, for all purposes.

This application is related to the following applications: U.S. Provisional Patent Application 61/124,681 filed Apr. 18, 2008 and PCT Application No. PCT/US09/32736 filed Jan. 30, 2009 titled MARKOV DECISION PROCESS-BASED DECISION SUPPORT TOOL FOR RESERVOIR DEVELOPMENT PLANNING; and U.S. Provisional Patent Application 61/124,929 filed Apr. 21, 2008 titled STOCHASTIC PROGRAMMING-BASED DECISION SUPPORT TOOL FOR RESERVOIR DEVELOPMENT PLANNING. These applications are incorporated by reference herein in their entirety.

TECHNICAL FIELD

This description relates generally to oil and gas production, and more particularly to reservoir development planning that takes uncertainty into consideration.

BACKGROUND

Developing and managing petroleum resources often entails committing large economic investments over many years with an expectation of receiving correspondingly large financial returns. Whether a petroleum reservoir yields profit or loss depends largely upon the strategies and tactics implemented for reservoir development and management. Reservoir development planning involves devising and/or selecting strong strategies and tactics that will yield favorable economic results over the long term.

Reservoir development planning may include making decisions regarding size, timing, and location of production platforms as well as subsequent expansions and connections, for example. Key decisions can involve the number, location, allocation to platforms, and timing of wells to be drilled and completed in each field. Post drilling decisions may include determining production rate allocations across multiple wells. Any one decision or action may have system-wide implications, for example, propagating positive or negative impact across a petroleum operation or a reservoir. In view of the aforementioned aspects of reservoir development planning, which are only a representative few of the many decisions facing a manager of petroleum resources, one can appreciate the value and impact of planning.

Computer-based modeling holds significant potential for reservoir development planning, particularly when combined with advanced mathematical techniques. Computer-based planning tools support making good decisions. One type of planning tool includes methodology for identifying an optimal solution to a set of decisions based on processing various information inputs. For example, an exemplary optimization model may work towards finding solutions that yield the best outcome from known possibilities with a defined set of constraints. Accordingly, a petroleum operation may achieve great economic benefit via properly applying optimization models for optimizing the development plans and management of petroleum resources, particularly those involving decision-making for multiple oil or gas fields over multiple years.

The terms "optimal," "optimizing," "optimize," "optimality," "optimization" (as well as derivatives and other forms of those terms and linguistically related words and phrases), as used herein, are not intended to be limiting in the sense of requiring the present invention to find the best solution or to make the best decision. Although a mathematically optimal solution may in fact arrive at the best of all mathematically available possibilities, real-world embodiments of optimization routines, methods, models, and processes may work towards such a goal without ever actually achieving perfection. Accordingly, one of ordinary skill in the art having benefit of the present disclosure will appreciate that these terms, in the context of the scope of the present invention, are more general. The terms can describe working towards a solution which may be the best available solution, a preferred solution, or a solution that offers a specific benefit within a range of constraints; or continually improving; or refining; or searching for a high point or a maximum for an objective; or processing to reduce a penalty function; etc.

In certain exemplary embodiments, an optimization model can be an algebraic system of functions and equations comprising (1) decision variables of either continuous or integer variety which may be limited to specific domain ranges, (2) constraint equations, which are based on input data (parameters) and the decision variables, that restrict activity of the variables within a specified set of conditions that define feasibility of the optimization problem being addressed, and/or (3) an objective function based on input data (parameters) and the decision variables being optimized, either by maximizing the objective function or minimizing the objective function. In some variations, optimization models may include non-differentiable, black-box and other non-algebraic functions or equations.

A typical (deterministic) mathematical optimization problem involves minimization or maximization of some objective function subject to a set of constraints on problem variables. This is commonly known as mathematical programming in the scientific and engineering community. Sub-categories of mathematical programming include linear programming (LP), mixed integer programming (MIP), non-linear programming (NLP) and mixed-integer nonlinear programming (MINLP). A deterministic optimization model is typically posed in the following form in which an objective function "f" is optimized subject to an array of constraint functions "g" that must be satisfied by setting the values of decision variable arrays "x" and "y". The constraint functions generally include a combination of known data parameters and unknown variable values when a mathematical programming model is posed.

$$\min f(x,y)$$

$$s.t. g(x,y) \leq 0$$

Solving the problem to mathematical optimality can comprise finding values for the decision variables such that all constraints are satisfied, wherein it is essentially mathematically impossible to improve upon the value of the objective function by changing variable values while still remaining feasible with respect to all of the constraints. When some of the "known" fixed parameters of the problem are actually uncertain in practice, the solution to the deterministic optimization problem may be sub-optimal, or possibly even infeasible, especially if the problem parameters take values that are ultimately different than those values chosen to be used as input into the optimization model that is solved.

The optimization process of reservoir development planning can be challenging, even under the assumption that the economics and behavior of reservoir and surface facilities are fully known. Typically, a large number of soft and hard constraints apply to an even larger number of decision variables. In practice, however, there exists uncertainty in reservoir behavior, economics, and/or other components of the decision process, which complicate the optimization process.

SUMMARY

Conventional reservoir development planning technologies generally fail to consider such uncertainty adequately. Uncertainty is ordinarily inherent in the information and factors pertinent to development planning That is, the inputs to the optimization problem (and perhaps the mathematical modeling of the problem) contain uncertainty. Uncertainty can be viewed as characteristics or aspects that are nondeterministic or that otherwise remain unknown, a priori. Conventional approaches for applying computer programming for decision support in developing and managing petroleum resources do not take a sufficiently comprehensive view of such uncertainty.

Currently, considerations for uncertainty in reservoir behavior, economics, or other components of the decision process are typically reduced to a very limited number of cases, for example, represented by a "high-side" case, a "most-likely" case, and a "low-side" case. For instance, the uncertainty in reservoir behavior is reduced to a known value, for each of the three cases mentioned above, by typically sampling random points within the uncertainty space. The term "uncertainty space," as used herein, generally refers to a representation of uncertainty relevant to a problem that is under solution, for example, the collective uncertainties for data input to an optimization routine.

Based upon limited sampling of the uncertainty space, a value is assigned to the "high-side" case, the "most-likely" case, and the "low-side" case. Decisions are usually optimized for a specific case, usually the "most-likely" case, and subsequently evaluated for the remaining two cases to provide an acceptable level of risk. This approach, however, grossly underestimates the complexity of the uncertainty and can lead to a solution that is sub-optimal or that is less favorable than some other unidentified solution.

In view of the foregoing discussion, need is apparent in the art for an improved tool that can aid reservoir development planning and/or that can provide decision support in connection with reservoir development and resource management. A need further exists for a tool that can take a broad range of uncertainties into consideration for the plans or decision support. A need further exists for a tool that systematically addresses uncertain data within a model used to produce plans or decision support. A need further exists for a tool that can handle a full uncertainty space in connection with producing reservoir development plans or decision support. A need further exists for a tool in which inherent uncertainty in data is incorporated directly into the decision optimization model, so tradeoffs associated with decisions across various realizations of the uncertainty are captured and hence, better information is available when making decisions regarding petroleum and/or natural gas reservoir development planning. The foregoing discussion of need in the art is intended to be representative rather than exhaustive. A technology addressing one or more such needs, or some other related shortcoming in the field, would benefit reservoir development planning, for example, providing decisions or plans for developing and managing a reservoir more effectively and more profitably.

The present invention supports making decisions, plans, strategies, and/or tactics for developing and managing petroleum resources, such as a petroleum reservoir.

In one aspect of the present invention, a computer- or software-based method can provide decision support in connection with developing one or more petroleum reservoirs. For example, the method can produce a reservoir development plan based on input data relevant to the reservoir and/or to the operation. Such input data can comprise, unknown or ill-defined fluid dynamics, the size of the reservoir, the current state of development, current and projected prices of petroleum, drilling costs, cost per hour of rig time, geological data, the cost of capital, current and projected available resources (human, financial, equipment, etc.), and the regulatory environment, to name a few representative possibilities. The input data can have uncertainty. More specifically, each element of input data can have an associated level, amount, or indication of uncertainty. Some of the input data may be known with a high level of uncertainty, such as the current cost of rig time, while other input data may have various degrees of uncertainty. For example, uncertainty of future rig time cost may increase as the amount of time projected into the future increases. That is, the uncertainty of rig time cost for the fifth year of the development plan would likely be higher than the uncertainty of rig time cost for the second year. The collective uncertainties of the input data can define an uncertainty space. A software routine can produce the reservoir development plan via processing the input data and taking the uncertainty space into consideration, for example via applying a robust optimization routine. Producing the reservoir development plan can comprise outputting some aspect of a plan, making a determination relevant to generating or changing a plan, or making a recommendation about one or more decisions relevant to reservoir development or management, for example.

In one general aspect, a method for reservoir development planning includes receiving data relevant to reservoir development. A reservoir development plan is generated in response to processing the received data via computer-implemented robust optimization.

Implementations of this aspect may include one or more of the following features. For example, the generating step may include generating the reservoir development plan according to an uncertainty space associated with the received data. The computer-implemented robust optimization may include optimizing at least some aspect of the reservoir development plan based on the received data and an uncertainty space. Receiving data may include receiving known data parameters and uncertain data parameters. Processing the received data via computer-implemented robust optimization may include processing the data with a robust optimization model that incorporates the uncertain data parameters. The uncertainty space may be associated with the received data. Processing the received data via computer-implemented robust optimization may include considering the uncertainty space in entirety.

In another general aspect, a method for reservoir development planning includes receiving data relevant to reservoir development planning, wherein uncertainty is associated with the data. At least some portion of a reservoir development plan is produced in response to processing the received data with a computer-based optimization model that incorporates the uncertainty.

Implementations of this aspect may include one or more of the following features. For example, uncertainty parameters may describe the uncertainty, and the computer-based optimization model may include a robust optimization model that incorporates the uncertainty parameters. Incorporating the uncertainty in the computer-based optimization model may include capturing tradeoffs across a plurality of realizations of the uncertainty. The step of producing at least some portion of the reservoir development plan in response to processing the received data with the computer-based optimization model that incorporates the uncertainty may include forcing feasibility of an optimization problem across an entire uncertainty space. Producing at least some portion of the reservoir development plan in response to processing the received data with the computer-based optimization model that incorporates the uncertainty may include systemically processing uncertain data within the optimization model.

In another general aspect, a method for decision support regarding development of petroleum resources includes receiving a plurality of data elements regarding a decision about developing a petroleum reservoir, wherein a respective characterization of uncertainty is associated with each of the data elements. A recommendation for the decision is output in response to processing each of the data elements and each of the respective characterizations of uncertainty with a computer-based optimization routine.

Implementations of this aspect may include one or more of the following features. For example, the computer-based optimization routine may include a robust optimization model. The robust optimization model may incorporate each of the respective characterizations of uncertainty. Processing each of the data elements and each of the respective characterizations of uncertainty with the computer-based optimization routine may include covering an uncertainty space.

In another general aspect, a computer-based method of optimizing development planning for a reservoir includes providing input data that comprises uncertainty. A first simulation of the reservoir is generated using a high fidelity model for reservoir or surface facility behavior utilizing the input data, wherein the first simulation generates first high fidelity output data. A low fidelity model for reservoir or surface facility behavior is generated using the input data and the first high fidelity output data, wherein the low fidelity model generates a prediction. A reservoir development planning model is optimized utilizing the input data and the low fidelity model for reservoir or surface facility behavior, wherein the reservoir development planning model generates reservoir development planning output data. A second simulation of the reservoir is performed using the high fidelity model for reservoir or surface facility behavior utilizing the input data and the reservoir development planning output data, wherein the second simulation generates second high fidelity output data. The second high fidelity output data is compared with the prediction of the low fidelity model. The steps comprising generating a low fidelity model for reservoir or surface facility behavior, optimizing a reservoir development planning model, performing a second simulation of the reservoir using the high fidelity model for reservoir or surface facility behavior, and comparing the second high fidelity output data with the prediction of the low fidelity model are repeated until the second high fidelity output data is substantially consistent with the prediction of the low fidelity model.

Implementations of this aspect may include one or more of the following features. For example, optimizing a reservoir development planning model may be performed using a robust optimization model. A development plan is generated in response to the second high fidelity output data being consistent with the prediction of the low fidelity model. A solution routine, interfacing with the robust optimization model, may assist the robust optimization model to optimize development planning for the reservoir. The robust optimization model may include a solution routine for assisting with optimizing development planning for the reservoir.

In another general aspect, a method of producing hydrocarbons from a subterranean reservoir includes generating a reservoir development planning system based on input data. The reservoir development planning system is optimized according to an uncertainty space. Hydrocarbons are produced from the reservoir according to output from the optimized reservoir development planning system.

Implementations of this aspect may include one or more of the following features. For example, the input data may include deterministic components and nondeterministic components. Optimizing the reservoir development planning system according to the uncertainty space includes considering each of the nondeterministic components with a robust optimization model. Optimizing the reservoir development planning system according to the uncertainty space may include executing a computer-based robust optimization model that incorporates uncertainty of the input data. The uncertainty space may specify inherent uncertainty of the input data. The reservoir development planning system may include an optimization model comprising a low fidelity reservoir model; and a high fidelity reservoir model. The high fidelity model accepts one or more parameter input data from the optimization model and provides one or more reservoir or surface facility property input data to the optimization model.

The discussion of decision support tools for reservoir development presented in this summary is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, and objects of the present invention will become apparent to one with skill in the art upon examination of the following drawings and detailed description. It is intended that all such aspects, systems, methods, features, advantages, and objects are to be included within this description, are to be within the scope of the present invention, and are to be protected by the accompanying claims.

Figure 1:
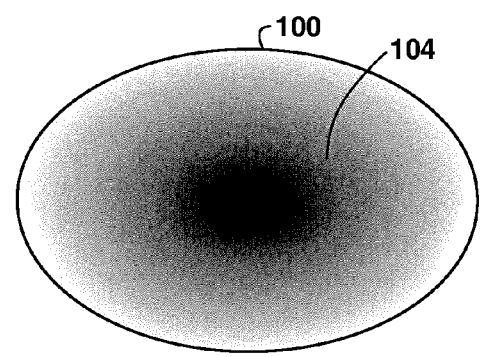
FIG. 1 is a graphical illustration representing the use of an entire uncertainty space associated with data for a reservoir model in accordance with certain exemplary embodiments of the present invention.

Many aspects of the present invention can be better understood with reference to the above drawings. The elements and features shown in the drawings are not necessarily to scale, emphasis instead being placed upon clearly illustrating principles of exemplary embodiments of the present invention. Moreover, certain dimensions may be exaggerated to help visually convey such principles. In the drawings, reference numerals designate like or corresponding, but not necessarily identical, elements throughout the several views.

DETAILED DESCRIPTION OF THE EXEMPLARY EMBODIMENTS

Exemplary embodiments of the present invention support making decisions regarding reservoir development planning while details of uncertain parameters remain unknown. Such uncertainties can be considered directly within an optimization model that can be a robust optimization model. In an exemplary embodiment, the robust optimization model systematically addresses all the uncertain data. Such a paradigm allows for producing flexible or robust optimization solutions that remain feasible covering the uncertainty space, as well as making the trade-off between optimality and the randomness or uncertainty in the input data.

In certain exemplary embodiments, robust optimization provides an approach to reservoir development planning and handles uncertainty effectively. In some embodiments, the optimization may be analogous to recourse models for stochastic programming. However, a penalty function in the objective may replace a feasibility for all possible realizations, sometime referred to as "scenarios." One exemplary embodiment of robust optimization integrates goal programming with scenario-based descriptions of problem data.

The present invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting, and among others supported by representations of the present invention.

An exemplary embodiment of the present invention will now be described in detail with reference to FIGS. 1-4. FIG. 1 is a graphical illustration of using the entire uncertainty space associated with data for a reservoir model in accordance with certain exemplary embodiments of the present invention. The oval shape represents the uncertainty space 100, which, as discussed above, characterizes uncertainty for information or data that will be considered for planning or decision making. The shading within the oval indicates that the full uncertainty space 100 is being considered, rather than just random data points within the uncertainty space 100. That is, the robust optimization model allows the entire uncertainty space 100 to be considered for all values 104 deemed possible. With this comprehensive view of uncertainty, the robust optimization model provides solutions that are more optimal.

Figure 2:
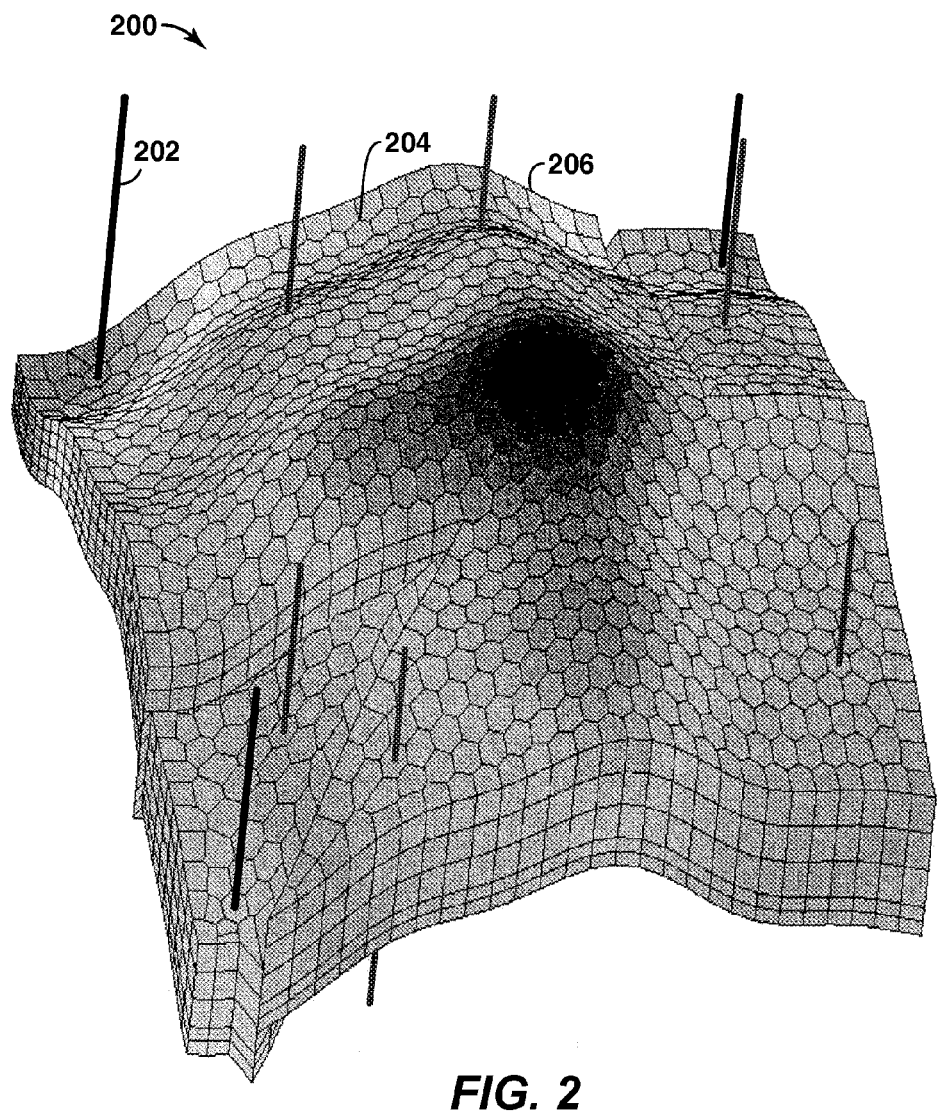
FIG. 2 is an illustration of a three-dimensional reservoir model including a grid mesh that defines a plurality of nodes in accordance with certain exemplary embodiments of the present invention.

FIG. 2 is an illustration of a three-dimensional reservoir model 200 including a grid mesh 206 that defines a plurality of nodes 204 in accordance with certain exemplary embodiments of the present invention. The reservoir model 200 may be used for simulating operation of an oil and/or gas reservoir with one or more vertical wells 202. As shown, the reservoir model 200 may be broken up into a plurality of nodes 204 by a grid mesh 206. The grid mesh 206 represents geological formation in cell format to support computer-based processing of reservoir and geological information according to the grid mesh 206. The nodes 204 of the reservoir model 200 may be of non-uniform size. This three-dimensional reservoir model 200 may provide additional data to be used in conjunction with a reservoir simulator.

Figure 3:
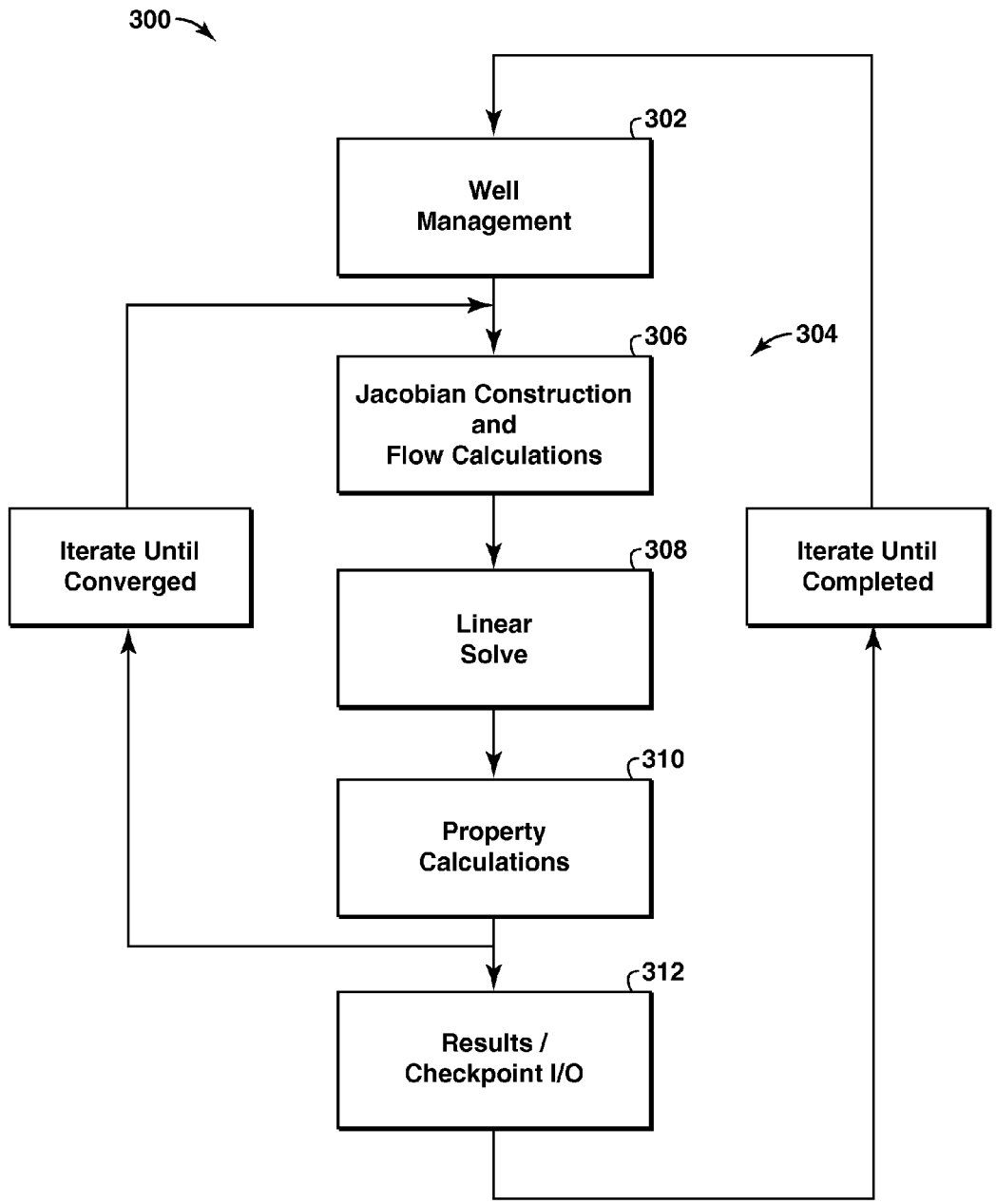
FIG. 3 is a flowchart illustration of a reservoir simulator for simulating the operation of the reservoir model of FIG. 2 in accordance with certain exemplary embodiments of the present invention.

FIG. 3 is a flowchart illustration of a reservoir simulator 300 for simulating the operation of the reservoir model 200 of FIG. 2 in accordance with certain exemplary embodiments of the present invention. In an exemplary embodiment, the simulator 300 comprises a set of instructions executing on a computer system. That is, the simulator 300 comprises one or more software programs running on one or more computers. Additionally, the computer may have one or more processors performing the simulation.

Referring to FIG. 2 and FIG. 3, the reservoir simulator 300 simulates the reservoir model's operation in which well management 302 is performed for the well 202 and surface facility network of the reservoir model 200. The well management 302 is performed over all wells 202 in the reservoir model 200 and includes an iterative process 304 in which a Jacobian construction and flow calculation 306 is performed, followed by a linear solve 308 and one or more property calculations 310. The linear solve 308 and/or the one or more property calculations 310 are performed over large arrays of data that represent properties such as, for example, pressure and composition at mesh points in the grid mesh 206.

Upon the completion and convergence of the iterative process 304 for the well 202 in the reservoir model 200, the data for the well 202 is then generated in a results/checkpoint I/O 312. Upon completion of the well management 302 for the well 202, the well management 302 may be performed for the remaining wells 202 of the entire reservoir model 200, wherein the results of each well 202 are generated in the results/checkpoint I/O 312.

The reservoir simulator 300 may be implemented, for example, using one or more general purpose computers, special purpose computers, analog processors, digital processors, central processing units, and/or distributed computing systems. That is, the reservoir simulator 300 can comprise computer executable instructions or code.

The output of the reservoir simulator 300 can comprise a result displayed on a graphical user interface (GUI), a data file, data on a medium such as an optical or magnetic disk, a paper report, or signals transmitted to another computer or another software routine (not an exhaustive list).

The reservoir model 200 and reservoir simulator 300 may be used to simulate the operation of the reservoir to thereby permit modeling of fluids, energy, and/or gases flowing in the hydrocarbon reservoirs, wells, and related surface facilities. Reservoir simulation 300 is one part of reservoir optimization which also includes constructing the data to accurately represent the reservoir. An exemplary simulation goal comprises understanding formation flow patterns in order to optimize some strategy for producing hydrocarbons from some set of wells 202 and surface facilities. The simulation is usually part of a time-consuming, iterative process to reduce uncertainty about a particular reservoir model description while optimizing a production strategy. Reservoir simulation, for example, is one kind of computational fluid dynamics simulation.

The reservoir model 200 and the reservoir simulator 300 may further be used to optimize the design and operation of the corresponding reservoir, wells, and related surface facilities.

Figure 4:
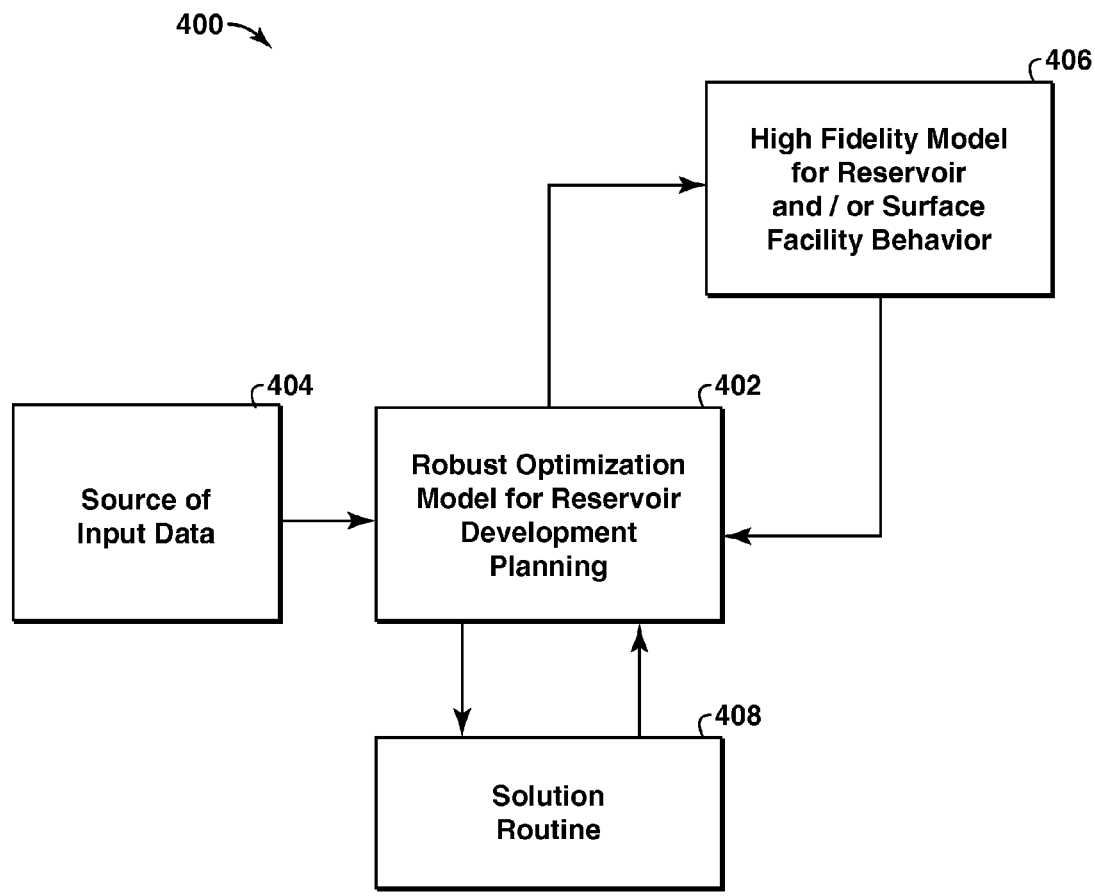
FIG. 4 is a schematic illustration of a robust optimization-based reservoir development planning system in accordance with certain exemplary embodiments of the present invention.

FIG. 4 is a schematic illustration of a robust optimization-based reservoir development planning system 400 in accordance with certain exemplary embodiments of the present invention. In an exemplary embodiment, the reservoir development planning system 400 is a computer program, a software-based engine, or a computing module. Moreover, each illustrated block in the diagram of FIG. 4 can comprise a computer program, a software-based engine, or a computing module. Thus, the robust optimization-based reservoir development planning system 400 may be implemented, for example, using one or more general purpose computers, special purpose computers, analog processors, digital processors, central processing units, and/or distributed computing systems.

The robust optimization-based reservoir development planning system 400 includes one or more robust optimization models for reservoir development planning 402. The robust optimization model for reservoir development planning 402 is a robust optimization model for optimizing the development plan given some target objective and subject to the constraints of the system.

Additionally, the robust optimization-based reservoir development planning system 400 may include at least one source of input data 404, a high fidelity model for reservoir and/or surface facility behavior 406 and a solution routine 408. The high fidelity model for reservoir and/or surface facility behavior 406 is a high fidelity model, or reservoir simulation model, used to update and adjust the robust optimization model for reservoir development planning 402 in subsequent iterations. Such updates and adjustments provide refinement as the robust optimization model for reservoir development planning 402 may contain an approximation of the high fidelity model for reservoir and/or surface facility behavior 406 within its system of constraint equations. A low fidelity model, which is included within the robust optimization model for reservoir development planning 402, provides this approximation of the high fidelity model for reservoir and/or surface facility behavior 406.

The robust optimization model for reservoir development planning 402 may receive input data from a source of input data 404. The input data can comprise data entries in one or more spreadsheets, one or more databases, information fed over a computer network or the Internet, manual entries, user input from a GUI, etc.

After processing the input data, the robust optimization model for reservoir development planning 402 may provide output to a high fidelity model for reservoir and/or surface facility behavior 406 of the reservoir under consideration. The high fidelity model for reservoir and/or surface facility behavior 406 may in turn provide its output data back to the robust optimization model for reservoir development planning 402. Finally, the robust optimization model for reservoir development planning 402 may interface with the solution routine 408.

The present exemplary embodiment provides a robust optimization-based reservoir development planning system 400 in which the inherent uncertainty in the data associated with a reservoir is incorporated directly into the robust optimization model for reservoir development planning 402. By incorporating the uncertainty in the data into the robust optimization model for reservoir development planning 402, tradeoffs associated with decisions across various realizations of the uncertainty are captured and hence, better information is available when making decisions regarding petroleum and/or natural gas reservoir development planning.

The aim of robust optimization is to choose a solution which is able to cope best with various realizations of uncertain data. The uncertain data is assumed to be unknown but bounded, and theoretical results may also assume convexity of the uncertainty space. The optimization problem with uncertain parameters is reformulated into a counterpart robust optimization problem. In this case, in addition to known or certain data parameters, there are also uncertain data parameters θ (theta) appearing in the constraints. The constraints are reformulated such that they must be satisfied given any possible realization of the uncertain parameters. The decision variable arrays "x" and "y" are now also posed such that they are dependent on the realizations of the uncertain parameters.

$$\min f(x,y)$$

$$s.t\ g(x,y;\theta) \leq 0\ \forall \theta \in \{\text{uncertainty space}\}$$

$$x \in X$$

$$y(\theta) \in Y$$

According to an exemplary embodiment, robust optimization ensures (or alternatively provides or supports) robustness and flexibility in an optimization solution by forcing feasibility of an optimization problem for the entire given uncertainty space, for example, essentially covering the uncertainty space. Solutions avoid violating (or do not violate) any constraint for any data realization. Furthermore, robust optimization allows mitigation of the worst-case scenario given.

In an exemplary embodiment, the robust optimization-based reservoir development planning system 400 provides a decision support tool to optimize a risk averse, risk neutral, or risk seeking measure of the objective function (e.g., net present value—NPV) satisfying all business problem constraints.

In an exemplary embodiment, the robust optimization model for reservoir development planning 402 may be a data independent mathematical abstraction of the reservoir model 200 (FIG. 2). The source of input data 404 may provide reservoir data which may, for example, be stored and retrieved from spreadsheets, databases, manual entry, or otherwise. The high fidelity model for reservoir and/or surface facility behavior 406 may include one or more reservoir or surface facility simulators such as, for example, the reservoir simulator 300 can comprise or be based upon software-based tools, programs, or capabilities; such as those marketed by: Schlumberger Technology Corporation under the registered trademark "ECLIPSE", Landmark Graphics Corporation under the registered trademark "VIP", or Landmark Graphics Corporation under the registered trademark "NEXUS". Also, the solution routine 408 may comprise one or more routines, methods, processes, or algorithms for solving the robust optimization model for reservoir development planning 402.

In an exemplary embodiment, the design and operation of the robust optimization model for reservoir development planning 402 and the solution routine 408 may be combined in whole or in part. Additionally, the design and operation of the robust optimization-based reservoir development planning system 400 may be implemented, for example, using one or more general purpose programmable computers which may, or may not, be distributed within or between one or more communication networks.

Figure 5:
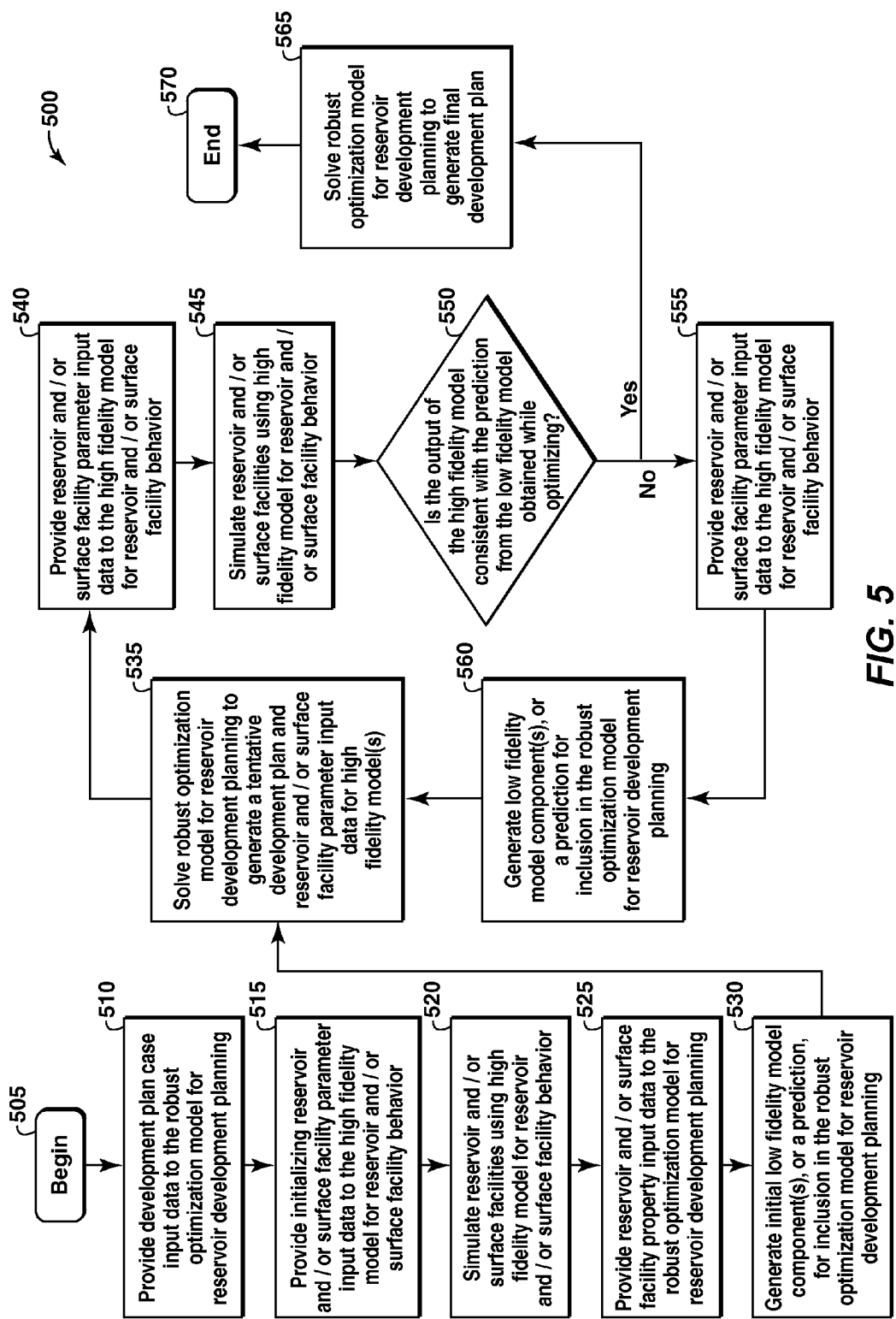
FIG. 5 is a flowchart illustration of a method for operating the robust optimization-based reservoir development planning system of FIG. 4 in accordance with certain exemplary embodiments of the present invention.

FIG. 5 is a flowchart illustration of a method 500 for operating the robust optimization-based reservoir development planning system of FIG. 4 in accordance with an exemplary embodiment.

Certain steps in the methods and processes described herein (with reference to FIG. 5 as well as the other figures) must naturally precede others for the present invention to function as described. However, the present invention is not limited to the order of the steps described if such order or sequence does not adversely alter the functionality of the present invention. That is, it is recognized that some steps may be performed before or after other steps or in parallel with other steps without departing from the scope and spirit of the present invention.

The present invention can include multiple processes that can be implemented with computer and/or manual operation. The present invention can comprise one or more computer programs that embody certain functions described herein and illustrated in the examples, diagrams, figures, and flowcharts. However, it should be apparent that there could be many different ways of implementing aspects of the present invention with computer programming, manually, non-computer-based machines, or in a combination of computer and manual implementation. The invention should not be construed as limited to any one set of computer program instructions. Further, a programmer with ordinary skill would be able to write such computer programs without difficulty or undue experimentation based on the disclosure and teaching presented herein.

Therefore, disclosure of a particular set of program code instructions is not considered necessary for an adequate understanding of how to make and use the present invention. The inventive functionality of any programming aspects of the present invention will be explained in further detail in the following description in conjunction with the figures illustrating the functions and program flow and processes.

Referring to FIG. 5, the method of operation 500, which will be discussed with exemplary reference to FIGS. 1, 2, 3 and 4, begins at step 505 and proceeds to step 510. At step 510 the development plan case input data is provided to the robust optimization model for reservoir development planning 402. The input data may be provided from a combination of manual data entry, spreadsheets, and databases and may include, but is not limited to, specifications of uncertain parameters (e.g., range of uncertain values), decision variables (e.g., time when they will be implemented), risk attitude, objective function, etc. These input data may form a data instance that is used to populate one or more mathematical models within the robust optimization model for reservoir development planning 402.

At step 515, the initializing reservoir and/or surface facility parameter input data is provided to the high fidelity model for reservoir and/or surface facility behavior 406. At step 520, the high fidelity model for reservoir and/or surface facility behavior 406 simulates the reservoir and/or surface facilities. This high fidelity model for reservoir and/or surface facility behavior 406 may include one or more high fidelity models for reservoir and surface facility behavior such as, for example, reservoir and facility simulators as discussed above. Additionally, upon performing the simulation, data relating to the operation of the reservoir and surface facilities are obtained, wherein the data includes, but is not limited to, production estimates, structure, flow properties, etc.

At step 525, the simulation results of the reservoir and/or surface facility property are provided as reservoir and/or surface facility property input data, which may also be referred to as first high fidelity output data, to the robust optimization model for reservoir development planning.

At step 530, the initial low fidelity model components are generated for inclusion in the robust optimization model for reservoir development planning 402. The initial low fidelity model components are a prediction for the reservoir and/or surface facility behavior. This prediction is generated from using the input data and the first high fidelity output data. The robust optimization model for reservoir development planning 402 includes a low fidelity model that is computationally efficient and provides an approximation of the reservoir and surface facility behavior. In other words, as compared to the high fidelity model, the low fidelity model provides less computational precision to produce relatively rough results and thus executes much faster on a typical computing system. The low fidelity model may be generated from a portion of the software code used in the high fidelity model for reservoir and/or surface facility behavior 406. For example, the software of high fidelity model can be tuned so as to run fewer iterations. The high fidelity model can be adapted or configured to provide the low fidelity model via running two dimensional cross sections, via reducing the number of parameter inputs, via specifying larger cell sizes, etc.

Upon completion of steps 505 to 530, the robust optimization model for reservoir development planning 402 is solved at step 535, utilizing the input data and the low fidelity model for reservoir and/or surface facility behavior. The robust optimization model for reservoir development planning 402 includes one or more robust optimization models that may, for example, include a MINLP-class model and a MINLP-based solution routine or algorithm.

The robust optimization model for reservoir development planning 402 can be solved using one or more fit-for-purpose solution routines that may be provided in the one or more of the robust optimization model for reservoir development planning 402 and the solution routine 408. The fit-for-purpose solution routines may include a combination of commercial or openly available mathematical programming solver routines and specially designed model-specific techniques. Thus, solving the robust optimization model for reservoir development planning 402 can be achieved without probability density functions for the uncertainty representation. The solving of the robust optimization model for reservoir development 403 planning generates a reservoir model solution, wherein a tentative development plan and reservoir and/or surface facility parameter input data, which may also be referred to as reservoir development planning output data, for the high fidelity model for reservoir and/or surface facility behavior 406 may be generated based on this reservoir model solution.

At step 540, the reservoir and/or surface facility parameter input data, generated by the solving of the robust optimization model for reservoir development planning 402, is provided to the high fidelity model for reservoir and/or surface facility behavior 406.

At step 545, the high fidelity model for reservoir and/or surface facility behavior 406 again simulates the reservoir and/or surface facilities. This simulation generates a corresponding high fidelity output data, which may also be referred to as the reservoir and/or surface facility property input data.

At step 550, a determination is made as to whether the output of the high fidelity model is substantially consistent with the prediction from the low fidelity model. If the components are not substantially consistent, the reservoir and/or surface facility property input data is again provided to the robust optimization model for reservoir development planning 402 at step 555. At step 560, the low fidelity model components are again generated for inclusion into the robust optimization model for reservoir development planning.

At step 535, the robust optimization model for reservoir development planning 402 is again solved. This process continues to iterate until the output of the high fidelity model is substantially consistent with the prediction from the low fidelity model at step 550. For example, when the results of the low fidelity model and the high fidelity model converge, step 550 can make a determination that a sufficient level of processing has been completed. At that point, step 550 deems the iterating complete.

Once the prediction from the low fidelity model is consistent with the output of the high fidelity model for reservoir and/or surface facility behavior 406, the robust optimization model for reservoir development planning 402 is again solved to generate an output which may include a final development plan at step 565. The output may be used to generate reports, calculations, tables, figures, charts, etc. for the analysis of development planning or reservoir management under data uncertainty. Moreover exemplary embodiments of the output comprise, a result displayed on a graphical user interface (GUI), a data file, data on a medium such as an optical or magnetic disk, a paper report, or signals transmitted to another computer or another software routine, or some other tangible output to name a few examples.

According to some embodiments, multiple cases may be tested and optimized so that their results may be compared side-by-side as part of the process. The method of operation 500 then ends at step 570. Although the method of operation 500 has been illustrated in steps, some of the steps may be performed in a different order without departing from the scope and spirit of the exemplary embodiment.

In various exemplary embodiments, the method 500 can be implemented using a mathematical programming language or system such as, for example, AIMMS, GAMS, AMPL, OPL, Mosel or using a computer programming language such as, for example, C++ or Java, or some combination of both. The fit-for-purpose solution routines may be developed in either mathematical programming languages or directly with a computer programming language or with support of commercially available software tools. For example, commercial and open source versions of mathematical programming languages and computer programming code compilers are generally available.

It is understood that variations may be made in the foregoing without departing from the scope and spirit of the invention. For example, the teachings of the present illustrative embodiments may be used to enhance the computational efficiency of other types of n-dimensional computer models.

Although illustrative embodiments of the present invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope and spirit of the invention.

What is claimed is:

1. A method for reservoir development planning, comprising the steps of:
   receiving data relevant to reservoir development; and
   generating a reservoir development plan in response to processing the received data via computer-implemented robust optimization, wherein the reservoir development plan is generated according to an uncertainty space associated with the received data.

2. The method of claim 1, wherein computer-implemented robust optimization comprises optimizing at least some aspect of the reservoir development plan based on the received data and the uncertainty space.

3. The method of claim 1, wherein the step of receiving data comprises receiving known data parameters and uncertain data parameters, and
   wherein processing the received data via computer-implemented robust optimization comprises processing the data with a robust optimization model that incorporates the uncertain data parameters.

4. The method of claim 1,
   wherein processing the received data via computer-implemented robust optimization comprises considering the uncertainty space in entirety.

5. A method for reservoir development planning, comprising the steps of:
   receiving data relevant to reservoir development planning, wherein uncertainty is associated with the data; and
   producing at least some portion of a reservoir development plan in response to processing the received data with a computer-based optimization model that incorporates the uncertainty, wherein uncertainty parameters describe the uncertainty, and wherein the computer-based optimization model comprises a robust optimization model that incorporates the uncertainty parameters.

6. The method of claim 5, wherein incorporating the uncertainty in the computer-based optimization model comprises capturing tradeoffs across a plurality of realizations of the uncertainty.

7. The method of claim 5, wherein the step of producing at least some portion of the reservoir development plan in response to processing the received data with the computer-based optimization model that incorporates the uncertainty comprises forcing feasibility of an optimization problem across an entire uncertainty space.

8. The method of claim 5, wherein the step of producing at least some portion of the reservoir development plan in response to processing the received data with the computer-based optimization model that incorporates the uncertainty comprises systemically processing uncertain data within the optimization model.

9. A method for decision support regarding development of petroleum resources, comprising the steps of:
   receiving a plurality of data elements regarding a decision about developing a petroleum reservoir, wherein a respective characterization of uncertainty is associated with each of the data elements; and
   outputting a recommendation for the decision in response to processing each of the data elements and each of the respective characterizations of uncertainty with a computer-based optimization routine, wherein the computer-based optimization routine comprises a robust optimization model.

10. The method of claim 9, wherein the robust optimization model incorporates each of the respective characterizations of uncertainty.

11. The method of claim 9, wherein processing each of the data elements and each of the respective characterizations of uncertainty with the computer-based optimization routine comprises covering an uncertainty space.

12. A computer-based method of optimizing development planning for a reservoir, comprising:
   providing input data that comprises uncertainty;
   generating a first simulation of the reservoir using a high fidelity model for reservoir or surface facility behavior utilizing the input data, wherein the first simulation generates first high fidelity output data;
   generating a low fidelity model for reservoir or surface facility behavior using the input data and the first high fidelity output data, wherein the low fidelity model generates a prediction;
   optimizing a reservoir development planning model utilizing the input data and the low fidelity model for reservoir or surface facility behavior, wherein the reservoir development planning model generates reservoir development planning output data;

performing a second simulation of the reservoir using the high fidelity model for reservoir or surface facility behavior utilizing the input data and the reservoir development planning output data, wherein the second simulation generates second high fidelity output data;

comparing the second high fidelity output data with the prediction of the low fidelity model;

repeating the steps comprising generating a low fidelity model for reservoir or surface facility behavior, optimizing a reservoir development planning model, performing a second simulation of the reservoir using the high fidelity model for reservoir or surface facility behavior, and comparing the second high fidelity output data with the prediction of the low fidelity model until the second high fidelity output data is substantially consistent with the prediction of the low fidelity model.

13. The method of claim 12, wherein the optimizing a reservoir development planning model is performed using a robust optimization model.

14. The method of claim 13, wherein a solution routine, interfacing with the robust optimization model, assists the robust optimization model to optimize development planning for the reservoir.

15. The method of claim 13, wherein the robust optimization model comprises a solution routine for assisting with optimizing development planning for the reservoir.

16. The method of claim 12, further comprising:
generating a development plan in response to the second high fidelity output data being consistent with the prediction of the low fidelity model.

17. A method of producing hydrocarbons from a subterranean reservoir, comprising:
generating a reservoir development planning system based on input data;
optimizing the reservoir development planning system according to an uncertainty space; and
producing hydrocarbons from the reservoir according to output from the optimized reservoir development planning system, wherein optimizing the reservoir development planning system according to the uncertainty space comprises executing a computer-based robust optimization model that incorporates uncertainty of the input data.

18. The method of claim 17, wherein the input data comprises deterministic components and nondeterministic components, and wherein the step of optimizing the reservoir development planning system according to the uncertainty space comprises considering each of the nondeterministic components with the robust optimization model.

19. The method of claim 17, wherein the uncertainty space specifies inherent uncertainty of the input data.

20. A method of producing hydrocarbons from a subterranean reservoir, comprising:
generating a reservoir development planning system based on input data;
optimizing the reservoir development planning system according to an uncertainty space; and
producing hydrocarbons from the reservoir according to output from the optimized reservoir development planning system,
wherein the reservoir development planning system comprises:
an optimization model comprising a low fidelity reservoir model; and
a high fidelity reservoir model,
wherein the high fidelity model accepts one or more parameter input data from the optimization model and provides one or more reservoir or surface facility property input data to the optimization model.

* * * * *